United States Patent [19]

Disston, Jr. et al.

[11] 4,025,064
[45] May 24, 1977

[54] WORK HOLD-DOWN FOR A MACHINE TOOL HAVING A TABLE AND COLUMN

[76] Inventors: Horace C. Disston, Jr.; Timothy Eichfeld; Leonard Van Dalen, all of 802 Olive St., Cherry Hill, N.J. 08034

[22] Filed: Feb. 9, 1976

[21] Appl. No.: 656,172

[52] U.S. Cl. .............................. 269/87.3; 269/97; 269/166; 408/97
[51] Int. Cl.² .......................................... B25B 1/00
[58] Field of Search .............. 269/91, 94, 97, 87.3, 269/166; 408/115, 109, 95, 97

[56] References Cited

UNITED STATES PATENTS

| | | | |
|---|---|---|---|
| 2,157,345 | 5/1939 | Nelson | 269/166 |
| 2,430,900 | 11/1947 | Welzler | 269/94 |
| 2,454,309 | 11/1948 | Davis | 269/236 X |
| 2,866,367 | 12/1958 | Wilkes | 269/91 |
| 3,185,470 | 5/1965 | Zitner | 269/91 |
| 3,382,742 | 5/1968 | Gibbs | 269/91 |

Primary Examiner—Al Lawrence Smith
Assistant Examiner—Robert G. Watson
Attorney, Agent, or Firm—Robert K. Youtie

[57] ABSTRACT

A work hold-down including a sleeve engaged about a column for free slidability and tiltability relative to the column, the sleeve being contractible for urgence from a tilted position toward a longitudinal position on the column, and an arm extending from the sleeve for movement therewith, the arm being downwardly engageable with a resting workpiece with the arm swung at least partially upwardly to releasably clamp the workpiece in position.

7 Claims, 5 Drawing Figures

U.S. Patent  May 24, 1977  4,025,064
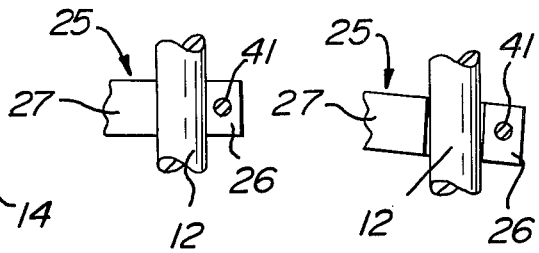
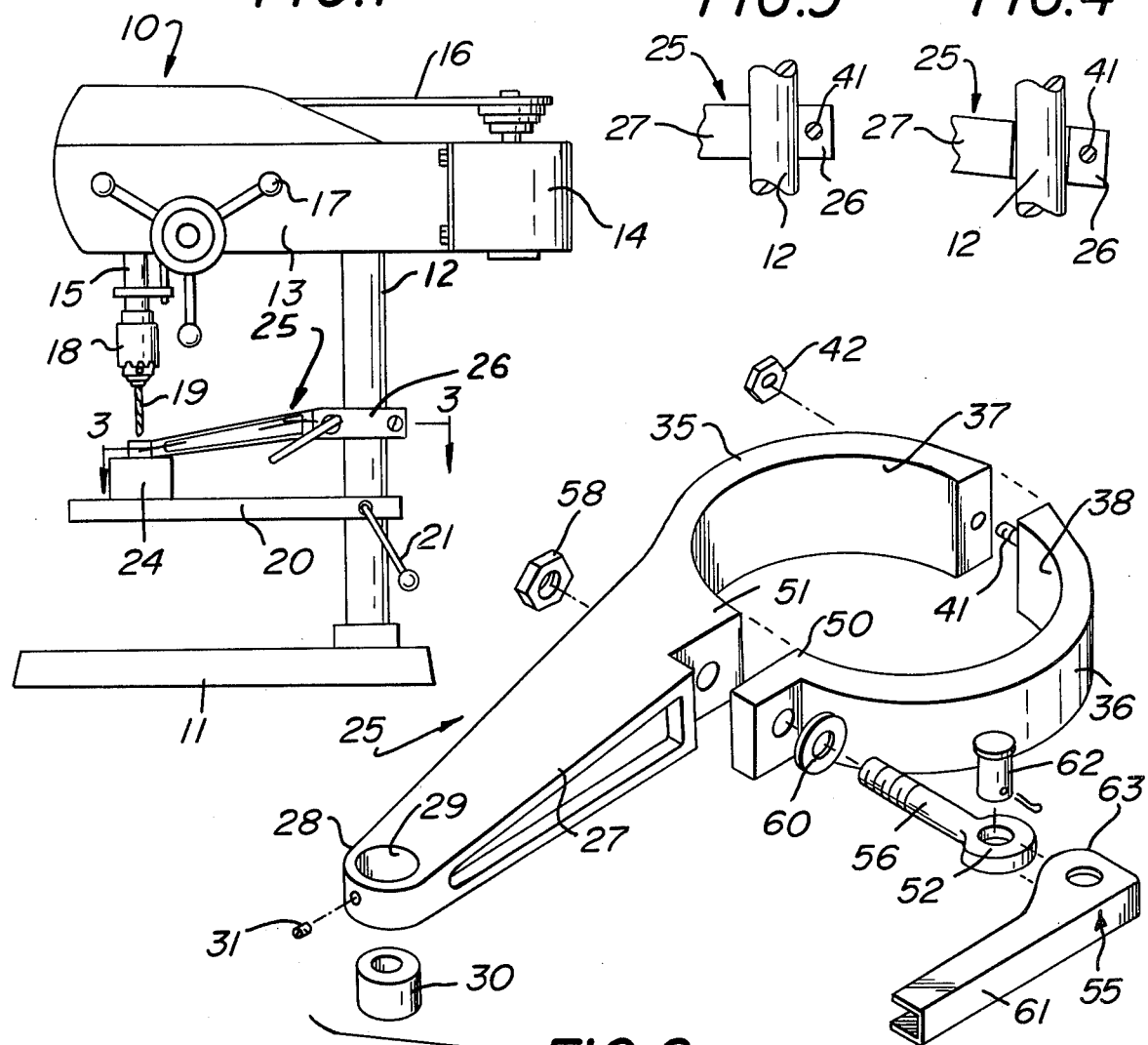
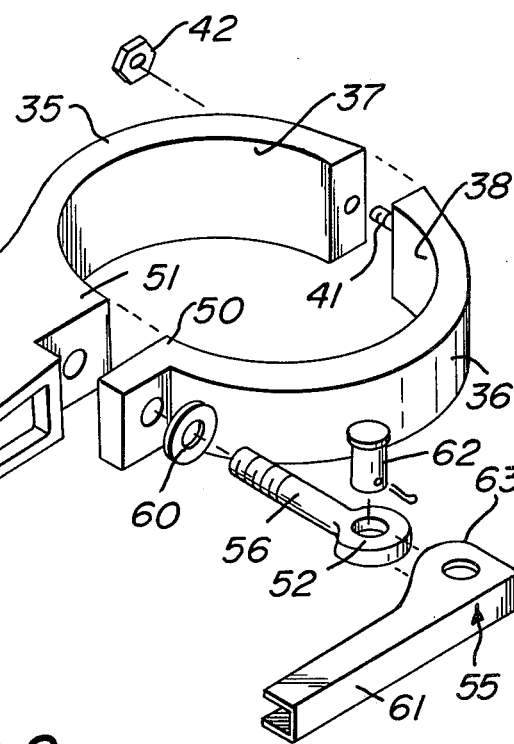
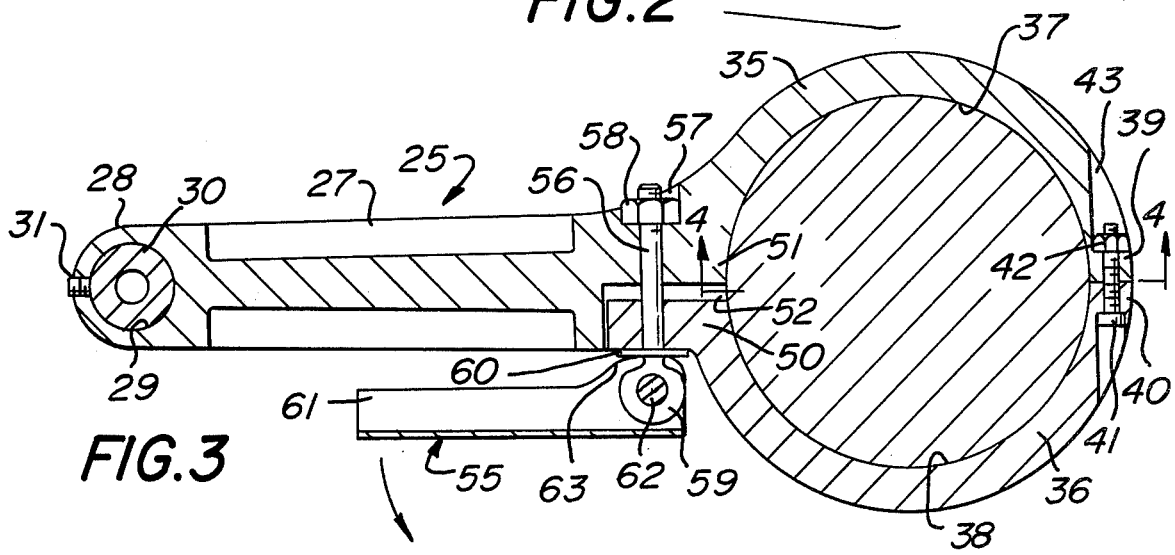

WORK HOLD-DOWN FOR A MACHINE TOOL HAVING A TABLE AND COLUMN

BACKGROUND OF THE INVENTION

While there have, in the past, been proposed a variety of hold-downs for workpieces on work tables, these prior devices have not been entirely satisfactory, as requiring undue manipulation, adjustment, and procedures requiring skill and consuming time. Also, prior work hold-downs were relatively limited in application, both as to size and location of workpiece, and often involved numerous parts and substantial expense in manufacture.

SUMMARY OF THE INVENTION

Accordingly, it is an important object of the present invention to provide a workpiece hold-down which is extremely simple in structure, quick and easy in operation, highly versatile for a wide variety of entirely different applications, including different types of workpieces and locations thereof, and which is even further usable as a tool guide, when desired.

It is still a further object of the present invention to provide a workpiece hold-down having the advantageous characteristics mentioned in the preceding paragraph, which is relatively economical in construction for sale at a reasonable price, and extremely durable and reliable for satisfactory operation throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a side elevational view showing a machine tool having associated therewith a workpiece hold-down constructed and employed in accordance with the teachings of the present invention.

FIG. 2 is an exploded, perspective view of the instant hold-down, enlarged for clarity of illustration.

FIG. 3 is a longitudinal sectional view taken generally along the line 3—3 of FIG. 1.

FIG. 4 is a sectional elevational view taken generally along the line 4—4 of FIG. 3 showing the hold-down in its operative condition of FIG. 1, the canted and jammed condition being exaggerated for clarity of understanding.

FIG. 5 is a sectional elevational view similar to FIG. 4, but showing the hold-down in fully contracted condition.

DESCRIPTION OF THE PREFERRED EMBODIMENT

Referring now more particularly to the drawings, and specifically to FIG. 1 thereof, a machine tool is there generally designated 10, and may include a lower end support or base 11, from which rigidly upstands a generally cylindrical post or column 12. A radial arm 13 projects from an upper region fo column 12, carrying at one end a drive means or motor 14 and carrying at its other end a depending rotary spindle 15, which may be operatively connenected in driven relation to the motor 14 by suitable transmission means, such as belt means 16. The spindle 15, in addition to its axial rotation, is vertically shiftable, as by a handwheel 17, and may carry a tool holder or chuck 18 on its lower end, being shown as provided with a tool bit or drill 19.

In addition, the machine tool 10 includes a generally horizontal work support or table 20 which may be adjustably fixed to and movable vertically along the column 12, by suitable holding means 21. As thus far described, the drill press 10 may be essentially conventional. Of course, other machine tool structures may be employed in conjunction with the instant invention, requiring only a work support and column or post.

Illustrated in position resting on the work table 20 is a workpiece 24, and associated with the column 12 and workpiece is a work hold-down generally designated 25, constructed in accordance with the teachings of the present invention. In particular, the work hold-down 25 includes an enlarged, open annular end portion or sleeve 26 circumposed about the column 12, and a generally raidal extension or arm 27 projecting externally, generally radially from the sleeve to terminate in an end portion 28. In the illustrated embodiment, the arm may decline outwardly at a slight angle, as best seen in FIG. 1. The arm end portin 28 may bear in downward engagement with respect to the workpiece 24, thereby defining a presser member effectively clamping the workpiece in position on the table. The presser member or end portin 28 may be formed with a generally cylindrical, vertically disposed, open ended through hole or bore 29 for receiving a tubular, open ended tool guide 30. The tool guide 30 may be hardened for wear resistance, if desired, and releasably secured within the presser member opening 29 by any suitable means, such as a holding member or set screw 31. In a manner appearing more fully hereinafter, the guide member 30 may serve as a drill bit guide, when desired.

The sleeve 26 may be of a split construction, including a generally semicylindrical sleeve part 35 which may extend from the adjacent end of arm 27. Viewed otherwise, the arm 27 and generally semicylindrical sleeve part 35 may be of integral, end-to-end formation, with the center of curvature of the sleeve generally along the extended longitudinal axis of the arm.

The sleeve 26 additionally includes a semicylindrical sleeve part 36 complementary to the sleeve part 35 and combining therewith to define a generally cylindrical internal surface constituted of the semicylindrical internal surface 37 of sleeve part 35 and the substantially identical semicylindrical internal surface 38 of sleeve part 36. In the illustrated embodiment the sleeve part 36 is separate from and connected to both the sleeve part 35 and arm 27.

More specifically, the sleeve parts 35 and 36 have their outer ends 39 and 40 in end-to-end abutting engagement and suitably fixedly secured together, as by bolt 41 and nut 42, or other suitable fastener means. As in the illustrated embodiment, the sleeve part end portion 39 may be recessed, as at 43, to conformably and nonrotatably receive the nut 42, and the bolt 41 extend rotatably through the sleeve part 40 and into recess 43 for threaded engagement with the nut 42. This relatively rigid assembly of sleeve parts 35 and 36 combine to define an internal cylindrical diameter of surfaces 37 and 38 having an internal diameter of slightly greater than the external diameter of column 12, about which the sleeve 26 is circumposed. That is, in the undeflected condition of assembled sleeve parts 35 and 36, there may be a clearance between the sleeve and received column 12 of about 0.025–0.030 inches. Such clearance enables the sleeve 26 to be freely slid up and down along the column 12 when the sleeve is disposed longitudinally of the column. However, by reason of the free or loose fit of the undeflected sleeve 36 circumposed about the column 12, the sleeve is tiltable or contable for a slight swinging movement about a generally horizontal axis relative to the column. The relatively minute clearance which is sufficient to afford the above-described longitudinal slidability and horizontal rotation or tiltability is not accurately representable in the accompanying drawings, but an exaggeration is shown in FIG. 4 of the tilted or canted condition to facilitate understanding. It will there be seen that the arm 27 has been swung upwardly to tilt or cant the sleeve 26 into ajammed or cocked positioned with relation to the column 12, so that any further upward movement of arm 27 is effectively prevented.

While the inner end of the sleeve part 35 may be integral with the inner end of arm 27, as described hereinbefore, the inner end portion 50 of the sleeve 36 is adjacent to but spaced from the proximate inner end portion 51 of sleeve part 35. That is, the adjacent inner end portions 50 and 51 of sleeve parts 36 and 35 are separated by a space 52 defining a split in sleeve 26. Thus, while the sleeve 26 may be generally rigid, the sleeve opening or split 52, and the inherent resiliency of the sleeve material, affords a slight contractability and expansability to the sleeve.

By suitable lever means, generally designated 55, interconnecting the adjacent, split sleeve end portions 50 and 51, the sleeve may be manually resiliently contracted, for purposes appearing presently. More partacularly, a tie member 56 such as an eye bolt may extend feely through both adjacent inner end portions 50 and 51 of sleeve parts 36 and 35. One sleeve part end portion may be provided with an outwardly facing recess, as at 57 in sleeve part 35, nonrotatably receiving a nut 58 threaded on the threaded end of tie member 56. Outwardly of the other sleeve part inner end portion 50, the tie member includes an eye 59, and a washer 60 may be freely circumposed about the tie member between the eye and adjacent sleeve part inner end portion 50 in bearing engagement with the latter. A cam lever or arm 61 has one end pivoted to the eye 59, as by a pin 62 passing through the eye, and is formed with a cam surface 63 engageable with washer 60 upon swinging movement or rotation of the arm 61 about the axis of pin 62. By the cam surface 63 having a variable radius from the axis of pin 62, the cam surface applies greater or lesser force attempting to contract sleeve 26 about column 12. Thus in the position shown in FIG. 3, with the lever arm 61 extending closely, longitudinally along the arm 27, the sleeve 26 is maximally contracted about column 12, and upon 90° rotation of lever 61 into general alignment with tie member 56, the sleeve contactile force is removed and the sleeve expands to its undeflected condition loosely circumposed about the column. In actual use, as a work hold-down, it is only necessary to let the expanded or undeflected sleeve fall along the column 12 until the presser arm end 28 engages downwardly on the workpiece 24. In this conditon, the sleeve 26 and arm 27 will be swung or tilted upwardly about a horizontal axis to a condition shown in FIG. 4, there being exaggerated. Obviously, in this condition, further upward movement of the arm 27 is prevented; and, moreover, the application of contractile force to sleeve 26, as by inward swinging of lever arm 61 toward presser arm 27 tends to close the sleeve more closely about the column 12 and swing the arm downwardly, thereby applying a clamping force to the workpiece 24 for holding the same in position during a metalworking operation. Of course, removal of the contractile sleeve force, as by outward swinging of lever 61 opens the sleeve, whereupon the workpiece 24 may be removed and the sleeve raised for repetition of the above-described procedure.

In another operational application of the instant invention, the sleeve 26 may be disposed longitudinally of the column 12, and in this condition, firmly clamped in embracing engagement about the column, as by swinging movement of the cam lever 61 toward the arm 27. This condition is shown in FIG. 5, wherein it will be apparent that the sleeve 26 is not tilted or canted. Further, in this condition the drill guide 30 carried in the outer end of arm 27 will be disposed generally vertically for receiving and guiding a drill bit. In this use as a drill guide, the sleeve 26 may remain clamped in position on the column 12 for many successively repeated operations. If desired, a pair of devices 25 may be simultaneously employed, one as a drill guide and the other as a work hold-down.

From the foregoing, it is seen that the present invention provides a unique work hold-down device which is extremely quick and easy to use in the clamping and releasing of successive workpieces, simple and staunch in construction for durabilty and reliabilty throughout a long useful life, highly versatile in its operational applications, and otherwise fully accomplishes its intended objects.

Although the present invention has been described in some detail by way of illustration and example for pupuses of clarity of understanding, it is understood that certain changes and modifications may be made within the spirit of the invention.

We claim:
1. A work hold-down for use with a machine tool having a work table and an upstanding column, said work hold-down comprising a sleeve having an internal dimension greater than the external dimension of and loosely circumposed about a machine tool column or sliding therealong and tiltable about a generally horizontal axes between a longitudinal position relative to and slidable on the column and a canted position jammed against upward movement along the column, said sleeve being releasably contractable about said column to urge the sleeve from its canted position toward its longitudinal position, an arm extending from said sleeve for location over said table and movable with said sleeve between an outstanding position and an upwardly swung position upon sleeve movement between respective longitudinal and canted positions, whereby said arm is downwardly engageable with a workpiece on said table in the upwardly swung arm position to releasably clamp the workpiece on the table upon contraction of said sleeve.

2. A work hold-down according to claim 1, in combination with a presser member on said arm remote from said sleeve for downward bearing engagement with a workpiece.

3. A work hold-down according to claim 1, said sleeve being internally cylindrical and said column being externally cylindrical for releasable contraction of said sleeve about said column into firm embracing engagement therewith, and a drill guide carried by said arm remote from said sleeve for guiding a drill to a workpiece.

4. A work hold-down according to claim 1, said sleeve being split and of an internal cylindrical diameter sufficiently greater than the external cylindrical diameter of said column to afford said tiltability, and lever means carried by said sleeve for resiliently deflecting the latter into firm embracing engagement with said column.

5. A work hold-down according to claim 4, said sleeve having a split adjacent to said arm, and said lever means extending along said arm.

6. A work hold-down according to claim 4, said lever means comprising a tie member extending across the split of said sleeve, and a cam lever connected to said tie member for increasing and descreasing tension in said tie member.

7. A work hold-down according to claim 1, said sleeve having a generally cylindrical iternal surface of sufficiently greater diameter than the external diameter of said column to afford said sleeve slidability and tiltability relative to said column, and said sleeve being releasably contractable into firm bearing engagement with said column for selective location thereon.

* * * * *